United States Patent
Anderson

(10) Patent No.: US 11,920,656 B2
(45) Date of Patent: *Mar. 5, 2024

(54) DUAL PISTON SYSTEM

(71) Applicant: Fox Factory, Inc., Duluth, GA (US)

(72) Inventor: Bryan Wesley Anderson, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/180,080

(22) Filed: Feb. 19, 2021

(65) Prior Publication Data
US 2021/0172493 A1 Jun. 10, 2021

Related U.S. Application Data

(63) Continuation of application No. 15/191,760, filed on Jun. 24, 2016, now Pat. No. 10,955,024.

(60) Provisional application No. 62/185,157, filed on Jun. 26, 2015.

(51) Int. Cl.
| | |
|---|---|
| *F16F 9/44* | (2006.01) |
| *B62K 25/08* | (2006.01) |
| *B62K 25/28* | (2006.01) |
| *F16F 9/34* | (2006.01) |
| *F16F 9/46* | (2006.01) |
| *F16F 9/516* | (2006.01) |

(52) U.S. Cl.
CPC ............ *F16F 9/3405* (2013.01); *B62K 25/08* (2013.01); *B62K 25/286* (2013.01); *F16F 9/461* (2013.01); *F16F 9/516* (2013.01); *B62K 2201/08* (2013.01)

(58) Field of Classification Search
CPC ...... B60G 17/048; F16F 9/348; F16F 9/3488; F16F 9/44; F16F 9/443; F16F 9/461; F16F 9/462; F16F 9/062; F16F 9/063; F16F 9/06; F16F 9/084; F16F 9/3214; F16F 9/3482; F16F 9/464; F16F 9/469; F16F 9/49; B62K 2201/08; B62K 25/08
USPC ..................................................... 267/64.18
See application file for complete search history.

(56) References Cited

U.S. PATENT DOCUMENTS

| | | | |
|---|---|---|---|
| 5,044,614 A | 9/1991 | Rau | |
| 5,553,836 A | 9/1996 | Ericson | |
| 5,803,443 A | 9/1998 | Chang | |
| 6,360,857 B1 * | 3/2002 | Fox ...................... | F16F 9/3485 |
| | | | 188/319.1 |
| 7,147,207 B2 | 12/2006 | Jordan et al. | |
| 7,293,764 B2 | 11/2007 | Fang | |
| 10,955,024 B2 * | 3/2021 | Anderson ............ | B62K 25/286 |
| 2006/0091345 A1 | 5/2006 | Jordan et al. | |
| 2007/0120300 A1 | 5/2007 | Achenbach | |

(Continued)

*Primary Examiner* — Nicholas J Lane
*Assistant Examiner* — Stephen M Bowes

(57) ABSTRACT

A dual piston system for independently controlling compression and rebound flowpaths therein, the dual piston system comprising: a first adjustable orifice configured for controlling rebound fluid flow, wherein the first adjustable orifice controls the rebound fluid flow through a first pathway associated with a low speed rebound flow and a second pathway associated with a high speed rebound flow; and a second adjustable orifice configured for controlling compression fluid flow, wherein the second adjustable orifice controls the compression fluid flow through a third pathway associated with a low speed compression flow and a fourth pathway associated with a high speed compression flow.

5 Claims, 12 Drawing Sheets

(56) References Cited

U.S. PATENT DOCUMENTS

| | | |
|---|---|---|
| 2009/0000888 A1 | 1/2009 | McAndrews |
| 2011/0174582 A1* | 7/2011 | Wootten .................. F16F 9/461 188/266 |
| 2012/0235332 A1 | 9/2012 | Jordan et al. |
| 2013/0105260 A1 | 5/2013 | Chen et al. |
| 2014/0305756 A1* | 10/2014 | Chen ....................... F16F 9/462 188/313 |
| 2015/0041267 A1 | 2/2015 | Van Zyk et al. |
| 2015/0183487 A1 | 7/2015 | Tsai |

\* cited by examiner

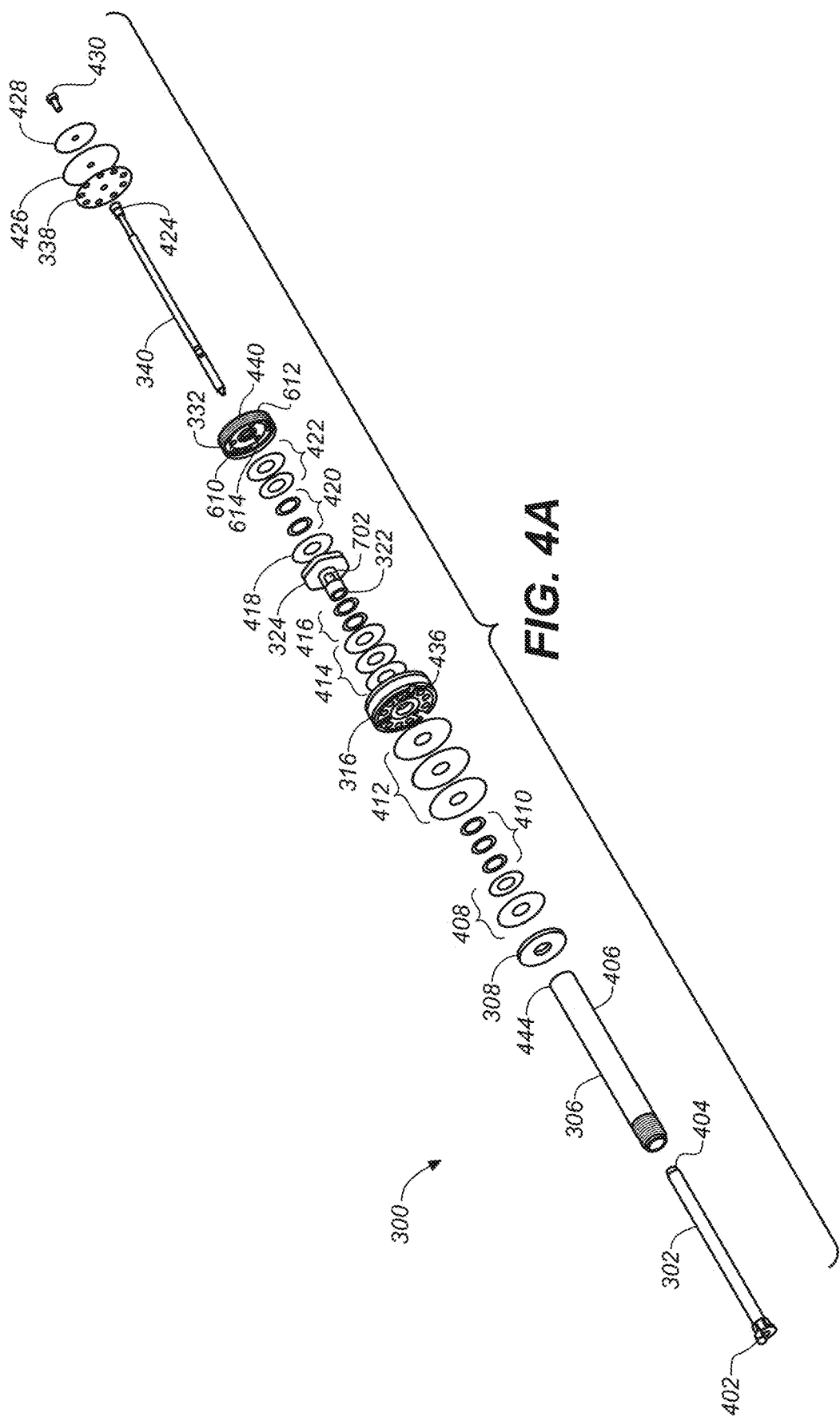

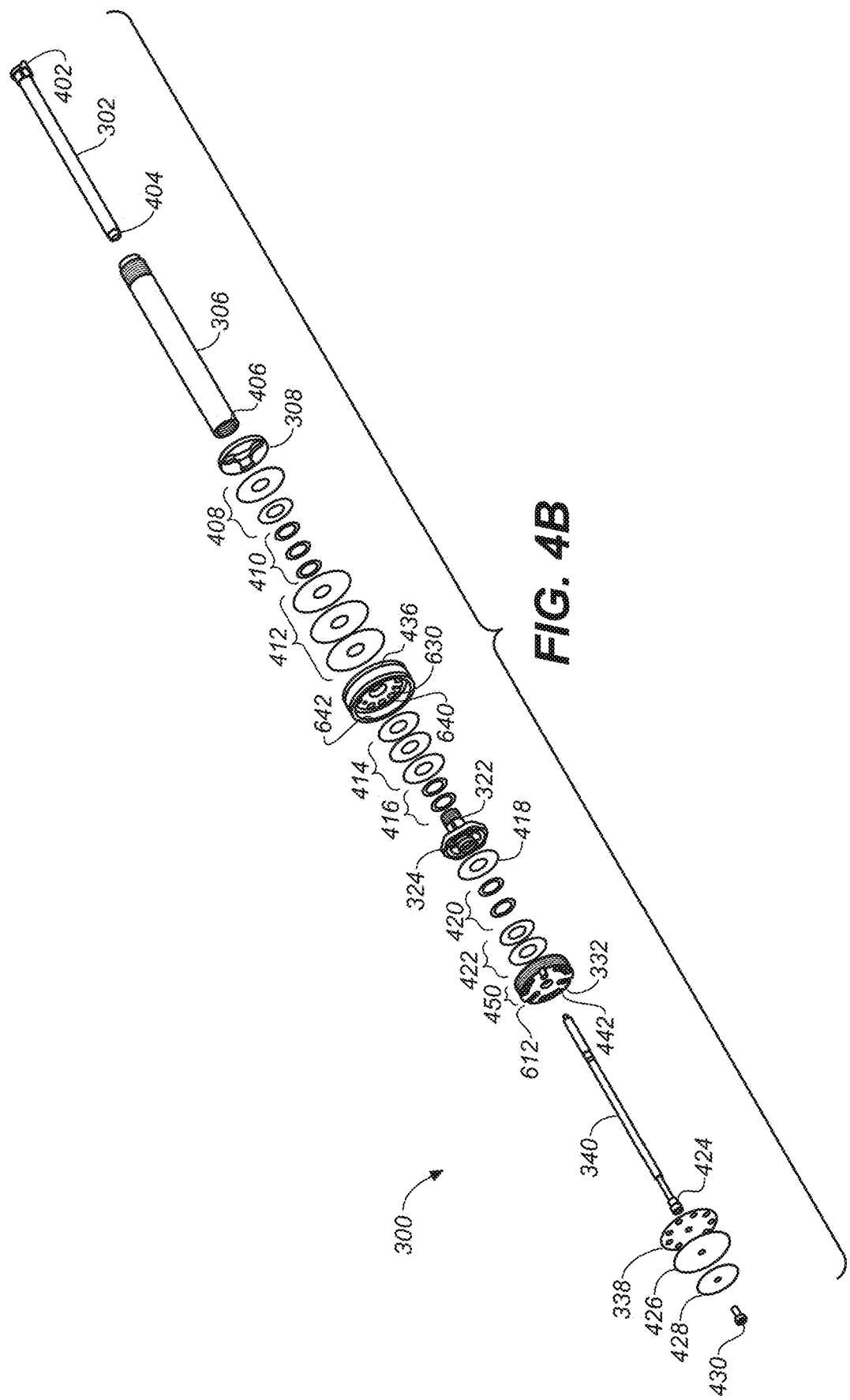

DUAL PISTON SYSTEM

CROSS-REFERENCE TO RELATED APPLICATIONS

This application claims the benefit of and claims priority to the U.S. patent application Ser. No. 15/191,760 filed on Jun. 24, 2016, entitled "DUAL PISTON SYSTEM" by Bryan Wesley Anderson, assigned to the assignee of the present application, and is hereby incorporated by reference in its entirety.

The application Ser. No. 15/191,760 claims the benefit of and claims priority to the U.S. Provisional Patent Application No. 62/185,157 filed on Jun. 26, 2015, entitled "DUAL PISTON SYSTEM" by Bryan Wesley Anderson, assigned to the assignee of the present application, and is hereby incorporated by reference in its entirety.

FIELD

The invention relates generally to vehicle suspensions and, more specifically, to a vehicle suspension having multiple flow pathways that are independently adjustable with regard to high speed compression and rebound and low speed compression and rebound.

BACKGROUND

Vehicle suspension systems typically include some form of a shock absorber. Many integrated damper/spring shock absorbers include a damper body surrounded by a mechanical spring. The damper body often consists of a vented piston and a shaft telescopically mounted in a fluid cylinder. Some shock absorbers utilize gas as a spring medium in place of, or in addition to, a mechanical spring. The spring rate of such shock absorbers may be adjustable such as by adjusting the preload of a mechanical spring or adjusting the pressure of the gas in the shock absorber. In that way, the shock absorber can be adjusted to accommodate heavier or lighter carried weight, or greater or lesser anticipated impact loads.

Some shock absorbers also utilize flow paths there through as a way to control the compression and rebound rate of the shock absorber. For example, a shock absorber may have a lever that has three possible compression settings at three different positions: 1) a soft setting; 2) a medium setting; and 3) a firm setting. In the soft setting, the valve(s) through which a flow path is situated is in the open position. As such, fluid flows freely and communicates across the valves, creating for the vehicle rider a feeling of a comfortable plush ride. In the medium setting, the valve(s) is partially open, partially blocking the flow of fluid there through, creating for the vehicle rider a feeling of firmness and support in the damper for pedaling. In the firm setting, the valve(s) is closed and locks out the flow of fluid there through, up to a maximum threshold, creating a very firm setting, which is good for pedaling on the open road, etc.

One disadvantage with conventional shock absorbers that have a lever with various settings, such as soft, medium and firm settings, is that in order to compensate for component positioning of one element, another is compromised. For example, when a rider goes over a jump and lands, the shock absorber (that is in an open soft setting) experiences compression at a high speed. This event may require a lower force threshold at a higher velocity, while a firm setting for maximum pedaling efficiency will require a high force threshold at a low velocity. If the two settings share the same threshold force, one setting will be compromised. The same is true for compression and rebound circuits. There are instances during a ride in which it is desired that the vehicle shock absorber rebound at a much lower speed than that speed at which the vehicle shock absorber compressed, and visa versa.

As the foregoing illustrates, what is needed in the art are improved systems and techniques for isolating and independently adjusting the soft, medium and firm settings of a shock absorber while providing the most comfortable ride possible to the vehicle rider.

BRIEF DESCRIPTION OF DRAWINGS

The accompanying drawings, which are incorporated in and form a part of this specification, illustrate embodiments of the present technology for a dual piston system, and, together with the description, serve to explain the principles discussed below:

FIG. 4A is an exploded elevation view of the dual piston system 300 of FIG. 3B, in accordance with an embodiment.

FIG. 4B is an exploded elevation view of the dual piston system 300 of FIG. 3B, in accordance with an embodiment.

DESCRIPTION OF EMBODIMENTS

Figure 1:
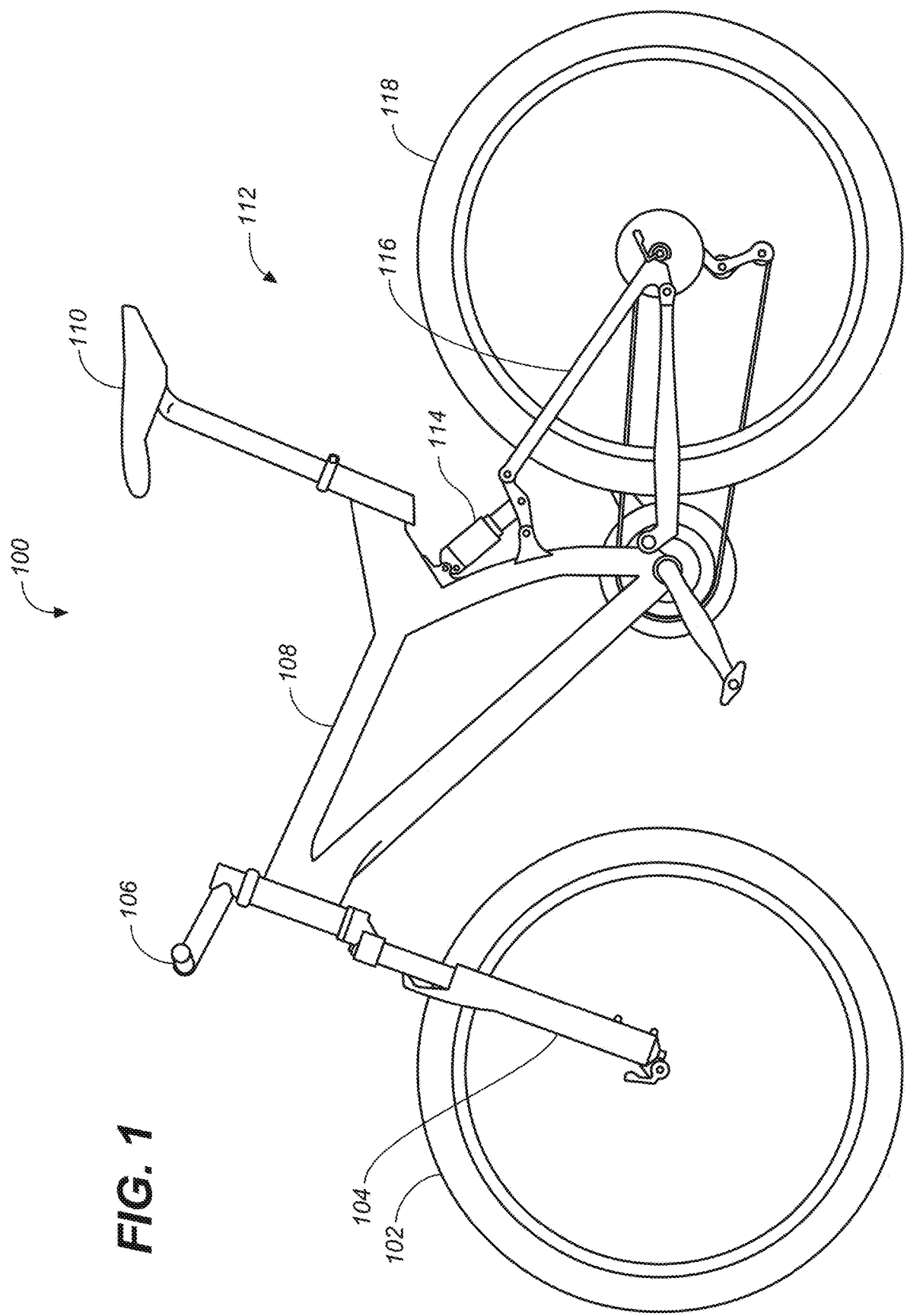
FIG. 1 is a side elevation view of a bicycle having a front wheel suspension fork and a rear shock, in accordance with an embodiment.

FIG. 1 illustrates an off-road bicycle, or mountain bike 100, including a frame 112 which is comprised of a main frame portion 108 and a swing arm portion 116. The swing arm portion 116 is pivotally attached to the main frame portion 108. The bicycle 100 includes front and rear wheels, 102 and 118, respectively, connected to the main frame 108. A seat 110 is connected to the main frame 108 in order to support a rider of the bicycle 100.

The front wheel 102 is supported by an embodiment of a suspension fork 104 which, in turn, is secured to the main frame 108 by a handlebar assembly 106. The rear wheel 118 is connected to the swing arm portion 116 of the frame 112. A rear shock 114 is positioned between the swing arm 116 and the frame 112 to provide resistance to the pivoting motion of the swing arm 116. Thus, the illustrated bicycle 100 includes suspension members between the front wheel 102 and the main frame 108 and the rear wheel 118 and the frame 112, which operate to substantially reduce wheel impact forces from being transmitted to the rider of the bicycle 100.

Figure 2:
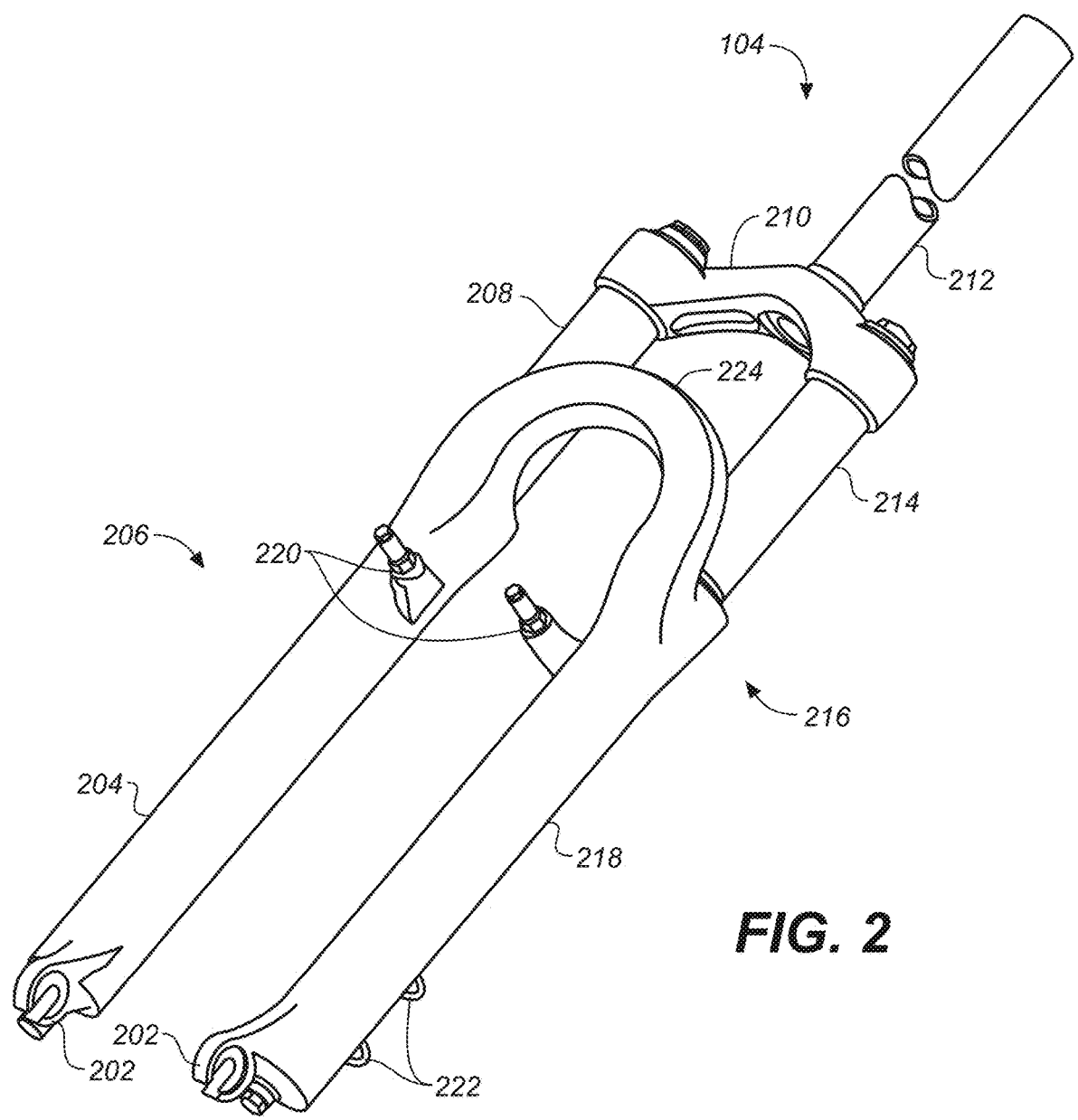
FIG. 2 is a side elevation view of the suspension fork of FIG. 1, which is illustrated as removed from the bicycle.

FIG. 2 illustrates the suspension fork 104 detached from the bicycle 100 of FIG. 1. The suspension fork 104 includes right and left legs 206 and 216, respectively, as reference by a person in a riding position on the bicycle 100. The right leg 206 includes a right upper tube 208 telescopically received in a right lower tube 204. Similarly, the left leg 216 includes a left upper tube 214 telescopically received in a left lower tube 218. A crown 210 connects the right upper tube 208 to the left upper tube 214, thereby connecting the right leg 206 to the left leg 216 of the suspension fork 104. In addition, the crown 210 supports a steerer tube 212, which passes through, and is rotatably supported by, the frame 112 of the bicycle 100. The steerer tube 212 provides a means for connection of the handlebar assembly 106 to the suspension fork 104, as illustrated in FIG. 1.

Each of the right lower tube 204 and the left lower tube 218 includes a drop out 202 for connecting the front wheel 102 to the fork 104. An arch 224 connects the right lower tube 204 and the left lower tube 218 to provide strength and minimize the twisting thereof. Preferably, the right lower tube 204, the left lower tube 218 and the arch 224 are formed as a unitary piece. However, the tubes 204 and 218 and arch 224 may be separate pieces and connected by a suitable fastening method.

The suspension fork 104 also includes a pair of rim brake bosses 220 to which a standard rim brake may be mounted. In addition, the fork 104 may include a pair of disc brake bosses 222 to which a disc brake may be mounted. Of course, the suspension fork 104 may include only one or the other of the rim brake bosses 220 and disc brake bosses 222, depending on the type of brake system desired.

Figure 3A:
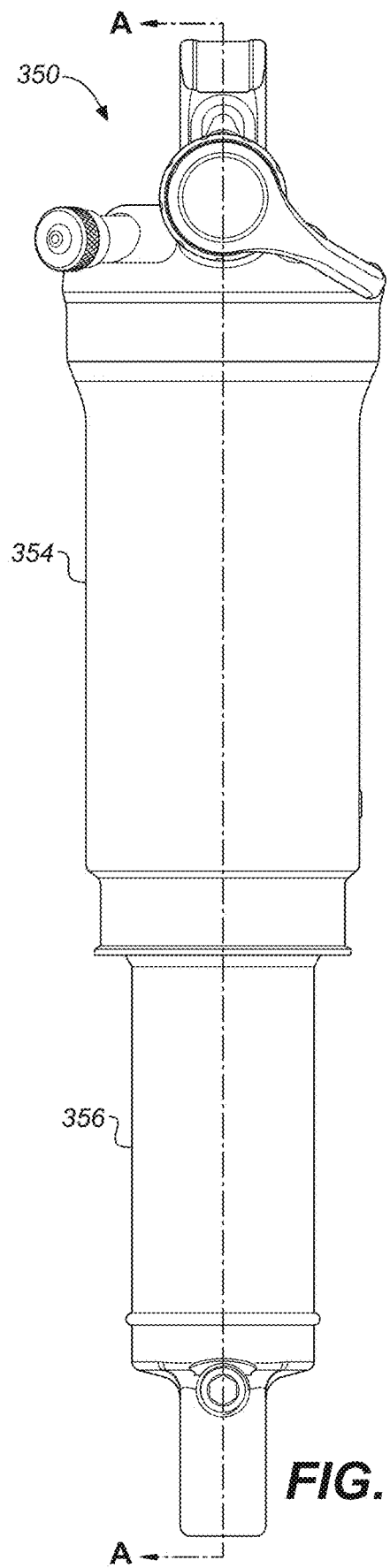
FIG. 3A is a side elevation view of a gas spring shock absorber, in accordance with an embodiment.
Figure 3B:
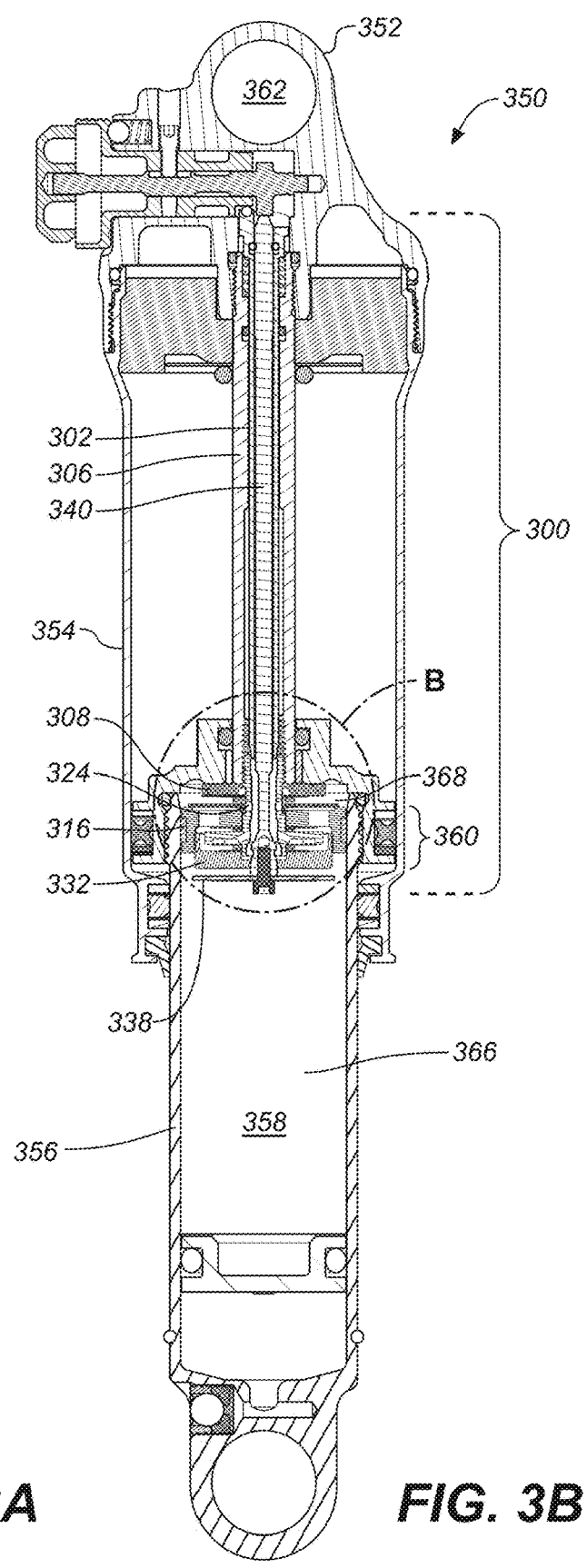
FIG. 3B is a sectional side elevation view of the gas spring shock absorber of FIG. 3A, in accordance with an embodiment, thus illustrating the internal components of the gas spring shock absorber.

Of note, while embodiments of the present technology described herein are discussed in reference to a rear shock 114 (and more particularly, an integrated damper/spring vehicle shock absorber, such as the gas spring shock absorber shown in FIGS. 3A and 3B), it should be appreciated that the suspension fork, such as the suspension fork 104 of FIG. 1, may also include the embodiments described herein. Of further note, embodiments may also be included within vehicles other than bicycles, such as, but not limited to, cars, motorcycles, trucks, side-by-sides, etc.

Further, as used herein and as would be recognized by those skilled in the art, shaft "speed" refers to, for example, the speed of the shock absorber's shaft when the bicycle and therefore the shaft are subjected to the impact of a compressive force, such as but not limited to a terrain feature. The shock absorber's shaft may sometimes be referred to as the piston rod by those skilled in the art. For a bicycle shock absorber, the normal operating range for main shaft speeds may be, for example, from 0 inches/second to 100 inches/second or more. Additionally, for clarity, as used herein, "compression forces" are the forces created by the impact of the bicycle with, for example, a terrain feature. "Compression damping forces" are the forces created by the shock absorber to slow the speed at which the shock absorber actually compresses when subjected to the compression force. Compression damping forces are created by the compression damping circuits restricting fluid flow through the fluid passageways.

In one embodiment, the rear shock, such as the rear shock 114 of FIG. 1 is an integrated damper/spring vehicle shock absorber. Integrated damper/spring vehicle shock absorbers often include a damper body surrounded by a mechanical spring or constructed in conjunction with an air spring. The damper body often consists of a piston and shaft telescopically mounted in a fluid filled cylinder. The mechanical spring may be a helically wound spring that surrounds the damper body. Various integrated shock absorber configurations are described in U.S. Pat. Nos. 5,044,614, 5,803,443, 5,553,836, and 7,293,764, each of which is herein incorporated, in its entirety, by reference.

Conventional technology provides that the compression of a shock absorber at a large displacement is followed by the rebound of the shock absorber at a high speed. Similarly, the compression of a shock absorber at a small displacement is conventionally followed by the rebound of the shock absorber at a low speed. Further, conventional technology provides that the high speed fluid flow within the shock absorber is directed through fluid pathways that are positioned toward the inner diameter of the shock absorber, while the low speed fluid flow is directed through fluid pathways that are positioned toward the outer diameter of the shock absorber.

In contrast to conventional technology, embodiments of the present technology provide for the ability to independently adjust the fluid pathways within the shock absorber such that the high speed compression rate and the high speed rebound rate may be adjusted independent of each other, and the low speed compression rate and the low speed rebound rate may be adjusted independent of each other.

In one embodiment of the present technology, the threshold fluid flow rate is at least one guiding factor in component placement. While the force threshold needed to activate the lock-out position (firm setting) is higher than the force threshold needed to activate the high-speed compression blow off (soft setting), the fluid flow rate is much lower. For optimal performance, it follows that components requiring a lower flow rate occupy regions of smaller flow area and components of a higher flow rate occupy regions of larger flow area. For example, low speed flow is routed toward the center of the damper tube and high speed flow is routed toward the outside of the damper tube.

Further, embodiments of the present technology guide the fluid that is experiencing a high fluid flow rate during high speed compression and/or high speed rebound to and along the outer most flow channels disposed within the dual piston valve of the shock absorber, while guiding the fluid that is experiencing a low fluid flow rate during low speed compression and/or low speed rebound to and along the inner most flow channels disposed within the dual piston valve of the shock absorber. This is advantageous at least because the outer diameter of the dual piston valve provides a greater region (and thus the potential for a greater area of fluid flow pathways) for larger amounts of fluid to flow there through, while the inner diameter has less available area for the fluid to flow there through. Additionally, the fluid pathway that accommodates the high speed compression flow is different from that fluid pathway that accommodates the high speed rebound flow. Similarly, the fluid pathway that accommodates the low speed compression flow is different from that fluid pathway that accommodates the low speed rebound flow. Further, the fluid pathway that accommodates the lockout position, according to embodiments, is different from the fluid pathways associated with high speed compression and rebound flows and low speed compression and rebound flows.

In accordance with embodiments, while the fluid flow paths occupy a combination of different passageways (or channels) throughout the dual piston system, sets of annular shims are strategically disposed within the dual piston system to completely block, partially block, and selectively block (e.g., bending open in response to a force applied thereto by fluid resulting from fluid pressure ultimately caused by compression and/or rebound of the shock absorber) fluid flow through these passageways. Such a design, in combination with two adjustable orifices that also selectively allow a particular amount of fluid there through, provide a system that enables the independent adjustment of low speed compression as compared to low speed rebound and high speed compression as compared to high speed rebound, as well as a fluid flow lockout position.

The ability to independently adjust and thus customize the fluid flow rates of the compression flow as compared to the rebound flow for the vehicle rider (as well as the lockout fluid flow rate) ultimately provides more efficient compression and rebound damping and a more comfortable, and/or at least a more desirable, ride for the vehicle rider.

The following discussion focuses upon a general description of the individual components and the order of assembly for these components. The discussion moves forward with a description of the fluid flow paths for low speed rebound flow, high speed rebound flow, low speed compression flow, high speed compression flow and lockout. The particularized structure and design of the individual components involved in these various fluid flow paths will be described in further detail at such time of discussion.

FIG. 3A is a side elevation view of a gas spring shock absorber, in accordance with an embodiment. As shown in FIG. 3A, the gas spring shock absorber 350 includes the gas cylinder 354 and the damping fluid cylinder 356. FIG. 3B is a sectional side elevation view of the gas spring shock absorber 350 of FIG. 3A, in accordance with an embodiment. The shock absorber 350 in FIG. 3B is shown in an extended position and may be mounted to the rear linkage of a vehicle via the eyelet 362, which may include a bearing (not shown). The shock absorber 350 is an integrated damper/gas spring type shock absorber that includes a damping fluid cylinder 356 telescopically housed within a gas cylinder 354. A shaft 306 connects a sealed, upper end of the gas cylinder 354 with a dual piston valve 360 movably mounted within the damping fluid cylinder 356. The upper end of the gas cylinder 354 is sealed via the mounting element 352. The damping fluid cylinder 356 is coupled to the dual piston valve 360 on a sealed, upper end of the damping fluid cylinder 356 and movably mounted within the gas cylinder 354.

Figure 4C:
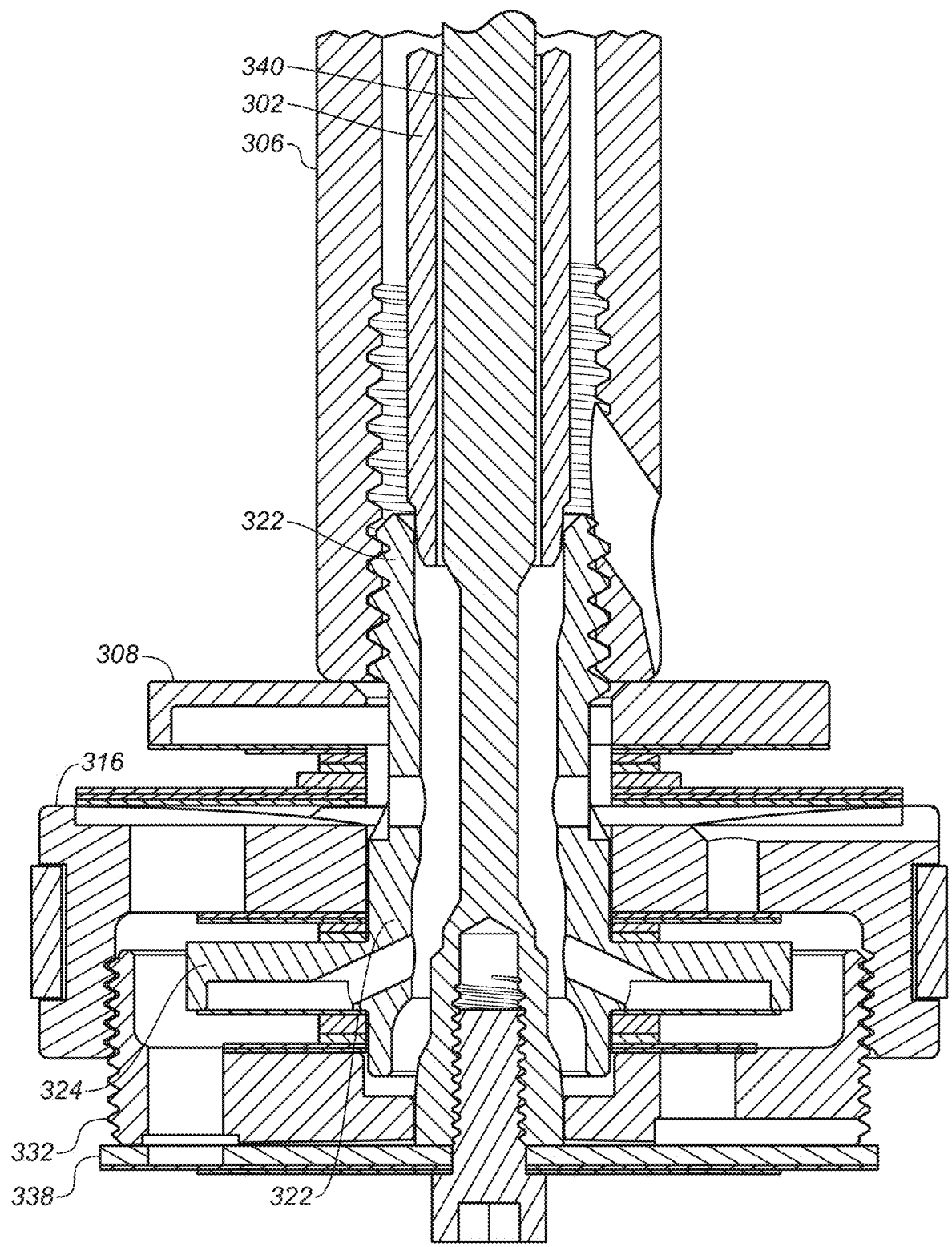
FIG. 4C is a sectional side elevation view of section B of FIG. 3B, in accordance with an embodiment.
Figure 5:
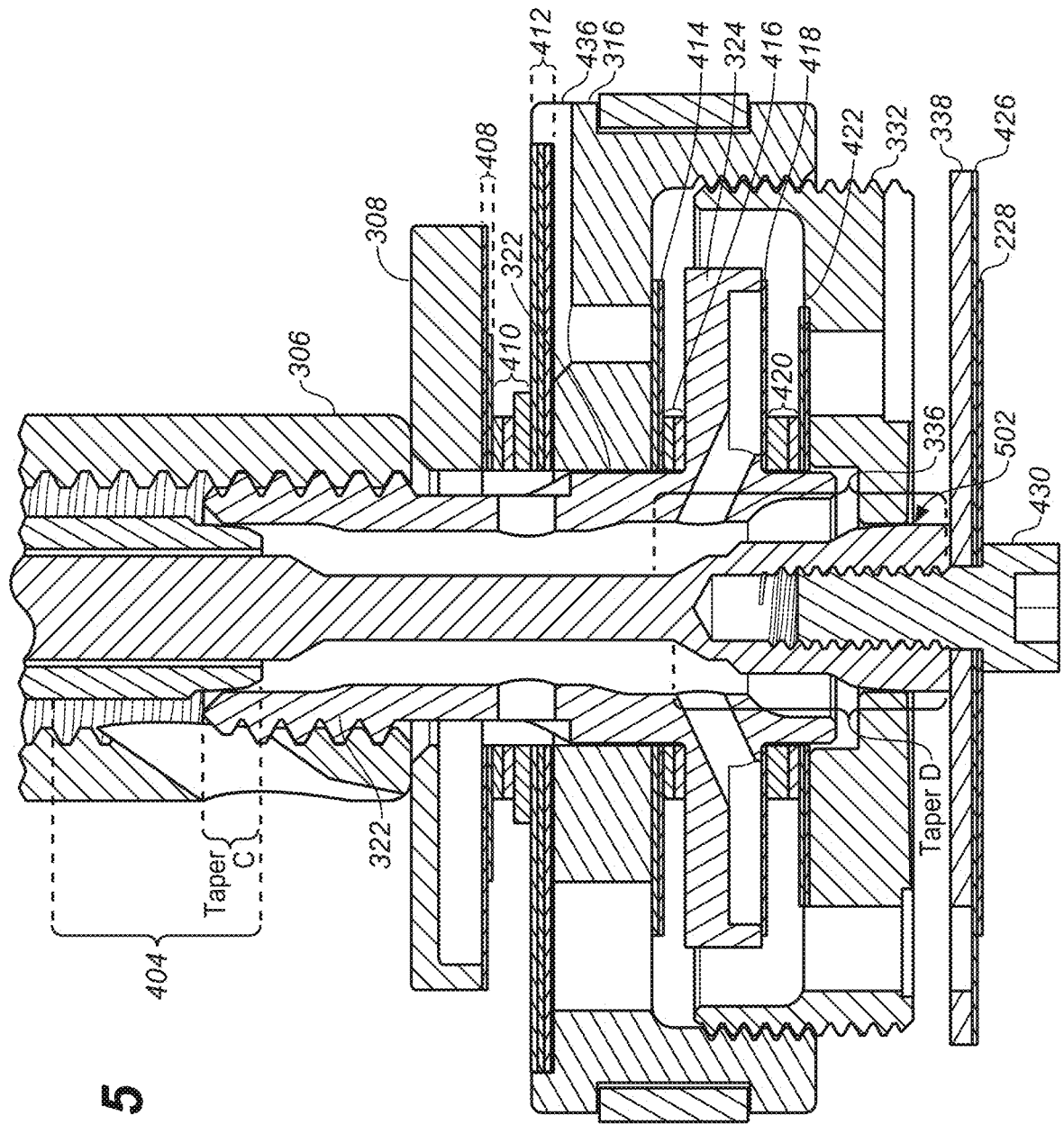
FIG. 5 is a sectional side elevation view of section B of FIG. 3B, in accordance with an embodiment.

FIG. 4A is an exploded elevation view of the dual piston system 300 of FIG. 3B, in accordance with an embodiment. FIG. 4B is an exploded view of the dual piston system 300 of FIG. 3B, in accordance with an embodiment. FIG. 4C is a sectional side elevation view of section B of FIG. 3B, in accordance with an embodiment. FIG. 5 is an enlarged sectional side elevation view of section B of FIG. 3B, in accordance with an embodiment.

The following is a list of the components of the dual piston system 300, as shown in FIGS. 4A, 4B, and 5, followed by a description of each's respective function. While FIGS. 4A and 4B show the dual piston system 300 in an exploded view, FIG. 5 shows the dual piston valve 360 with the components shown in FIGS. 4A and 4B as assembled.

With reference now to FIGS. 4A and 5, it is shown that the rebound adjust rod 302 includes taper "C" at one end 404 and the adjuster element 402 at the other end. The rebound adjust rod 302 is hollow and is designed to fit, end 404 first, into the hollow shaft 306, up until the adjuster element 402, since the adjuster element 402 is wider than the inner diameter of the shaft 306. Thus, the adjuster element 402 does not fit within the hollow shaft 306. A set of holes 444 (one or more holes, hidden) is located at the end 406 of the shaft 306. The set of holes 444 traverse the wall of the shaft 306 such that fluid may flow between the area external to the surface of the outer wall of the shaft 306 and area internal to the surface of the inner wall of the shaft 306.

The rebound check plate 324 is rotatably secured to one end of the shaft 306 via the hollow piston bolt 322. The hollow piston bolt 322 includes threads on its outer surface, that match the threads disposed on the inner surface of the end 406 of the shaft 306. The rebound check plate 324 is attached to the piston bolt 322. In one embodiment, the piston bolt 322 and the rebound check plate 324 are manufactured to be one piece. In another embodiment, the piston bolt 322 and the rebound check plate 324 are manufactured as separate pieces that attach to each other via various methods of attachment known in the art.

Of note, the end 404 of the rebound adjust rod 302 includes the taper C, which tapers such that the thickest (widest) section of taper C is located closest to the adjuster element 402 and the thinnest (narrowest) section is that part of the rebound adjust rod 302 which is first inserted into the piston bolt 322. Thus, when the taper C at the end 404 is inserted into the central hole of the piston bolt 322, depending upon the extent of insertion, either the entirety of the width of the taper C will fill the entirety of the opening of the hole central to the piston bolt 322 or a portion of taper C will fill a portion less than the entirety of the opening of the hole of the piston bolt 322. Thus, if a portion less than the whole of the entirety of the opening of the hole in the piston bolt 322 is occupied by a portion less than the widest part of the taper C, then a gap 602 (see FIG. 6A remains between the inner diameter of the opening of the hole central to the piston bolt 322 and the outer diameter of the taper C. According to embodiments, in some instances and as will be explained herein, fluid may flow through this gap 602.

As shown in FIG. 4A, between (and inclusive) the rebound check plate 324 and the end 406 of the shaft 306, the following components are shown, and are listed as ready for assembly in the order beginning with those components closest to the adjuster element 402 of the rebound adjust rod 302: compression check plate 308; low speed compression check shims 408; pivot shims 410; high speed compression shims 412; main damping piston 316 (also referred to as first damping piston 316); shims 414; and small diameter shims 416. Of note, a certain number of low speed compression check shims 408, pivot shims 410, high speed compression shims 412, shims 414, and small diameter shims 416 are shown. However, in various embodiments, it should be appreciated that there may be more or less shims than those shown in the figures herein, such as, but not limited to, FIGS. 4A and 4B.

The inner surface of the side wall of the main damping piston 316 has threads that match the threads of the outer surface of the side wall of the secondary (lockout) damping piston 332 (also referred to as second damping piston 332). Thus, the secondary (lockout) damping piston 332 screws into the main damping piston 316, having disposed there between the rebound check plate 324. In between the secondary (lockout) damping piston 332 and the bottom of the rebound check plate 324, the following components are shown ready for assembly and are listed in the order closest to the end 406 of the shaft 306: larger diameter shim 418, pivot shims 420; and shims 422. Of note, a certain number of larger diameter shims 418, pivot shims 420 and shims 422 are shown. However, in various embodiments, it should be appreciated that there may be more or less shims than those shown in the figures herein, such as, but not limited to, FIGS. 4A and 4B.

The compression adjust rod 340 is designed to be inserted into the holes shown central to the following components and inserted in the following order: secondary (lockout) damping piston 332; shims 422; pivot shims 420; larger diameter shim 418; rebound check plate 324; piston bolt 322; small diameter shims 416; shims 414; main damping piston 316; high speed compression shims 412; pivot shims 410; low speed compression check shims 408; compression check plate 308; shaft 306; and rebound adjust rod 302. The end 424 of the compression adjust rod 340 includes the taper D, which tapers such that the thickest (widest) section of taper D is located next to the lockout plate/rebound check valve 338 and the thinnest (narrowest) section is closest to the secondary (lockout) damping piston 332. Thus, when the taper D at the end 424 is inserted into the central hole of the secondary (lockout) damping piston 332, depending upon the extent of the insertion, either the entirety of the width of the taper D will fill the hole central to the secondary (lockout) damping piston 332 or fill a portion less than the whole of the hole central to the secondary (lockout) damping piston 332. Thus, if a portion less than the whole of the hole in the secondary (lockout) damping piston 332 is occupied with a portion less than the widest section of the taper D, then a gap 502 (see FIG. 5 for an indication of location of the gap 502, should it exist) remains between the inner diameter of the hole central to the secondary (lockout) damping piston 132 and the outer diameter of the taper D. According to embodiments, in some instances and as will be explained herein, fluid may flow through the gap 502.

FIG. 4C shows at least the following components described herein: the lockout plate/rebound check valve 338; the secondary (lockout) damping piston 332; the rebound check plate 324; the piston bolt 322; the main damping piston 316; the compression check plate 308; the compression adjust rod 340; the rebound adjust rod 302; and the shaft 306.

Figure 7A:
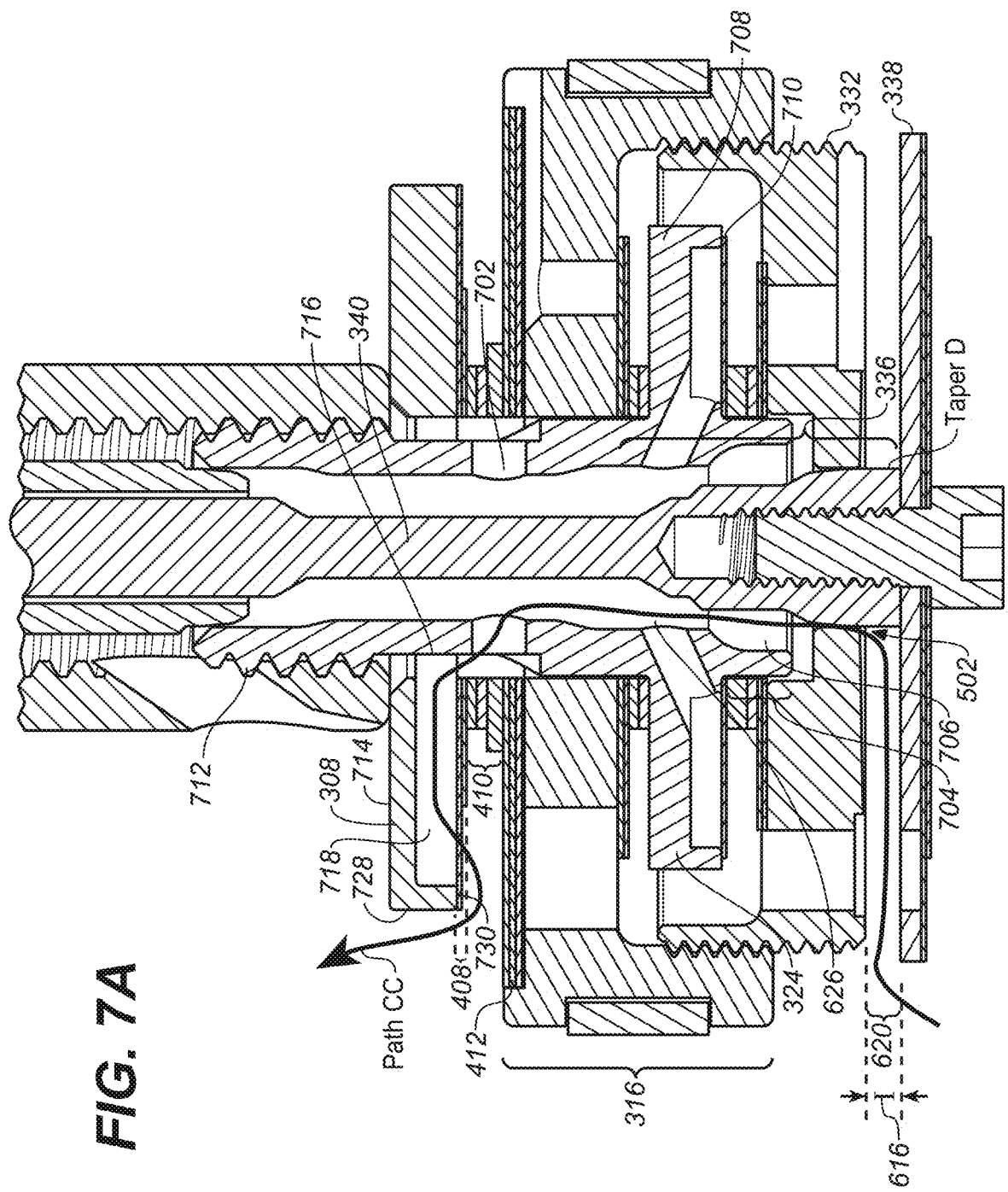
FIG. 7A is a sectional side elevation view of section B of FIG. 3B illustrating fluid pathway CC in regard to low speed compression flow, in accordance with an embodiment.
Figure 7B:
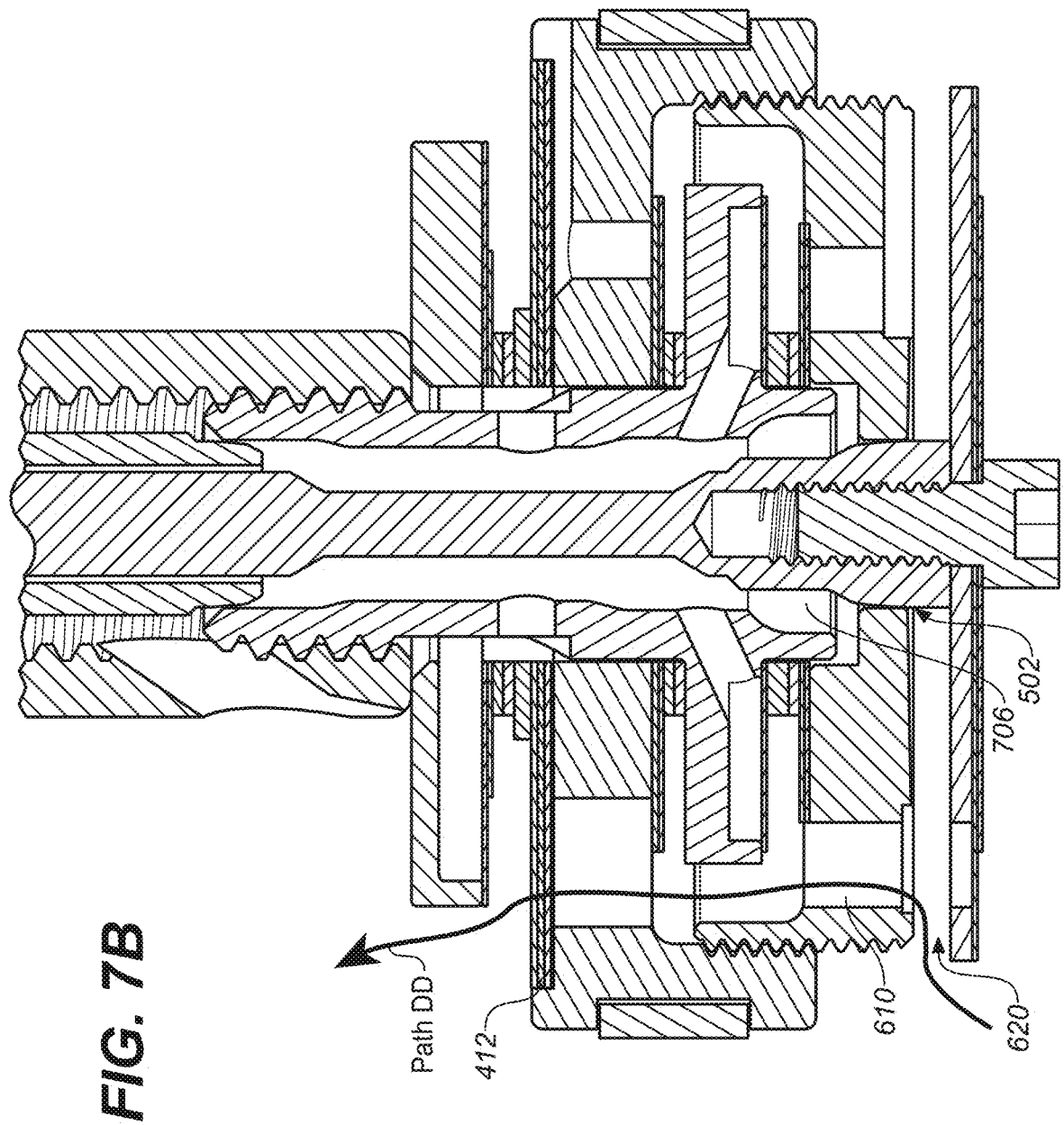
FIG. 7B is a sectional side elevation view of section B of FIG. 3B illustrating fluid pathway DD, in regard to high speed compression fluid flow, in accordance with an embodiment.
Figure 8:
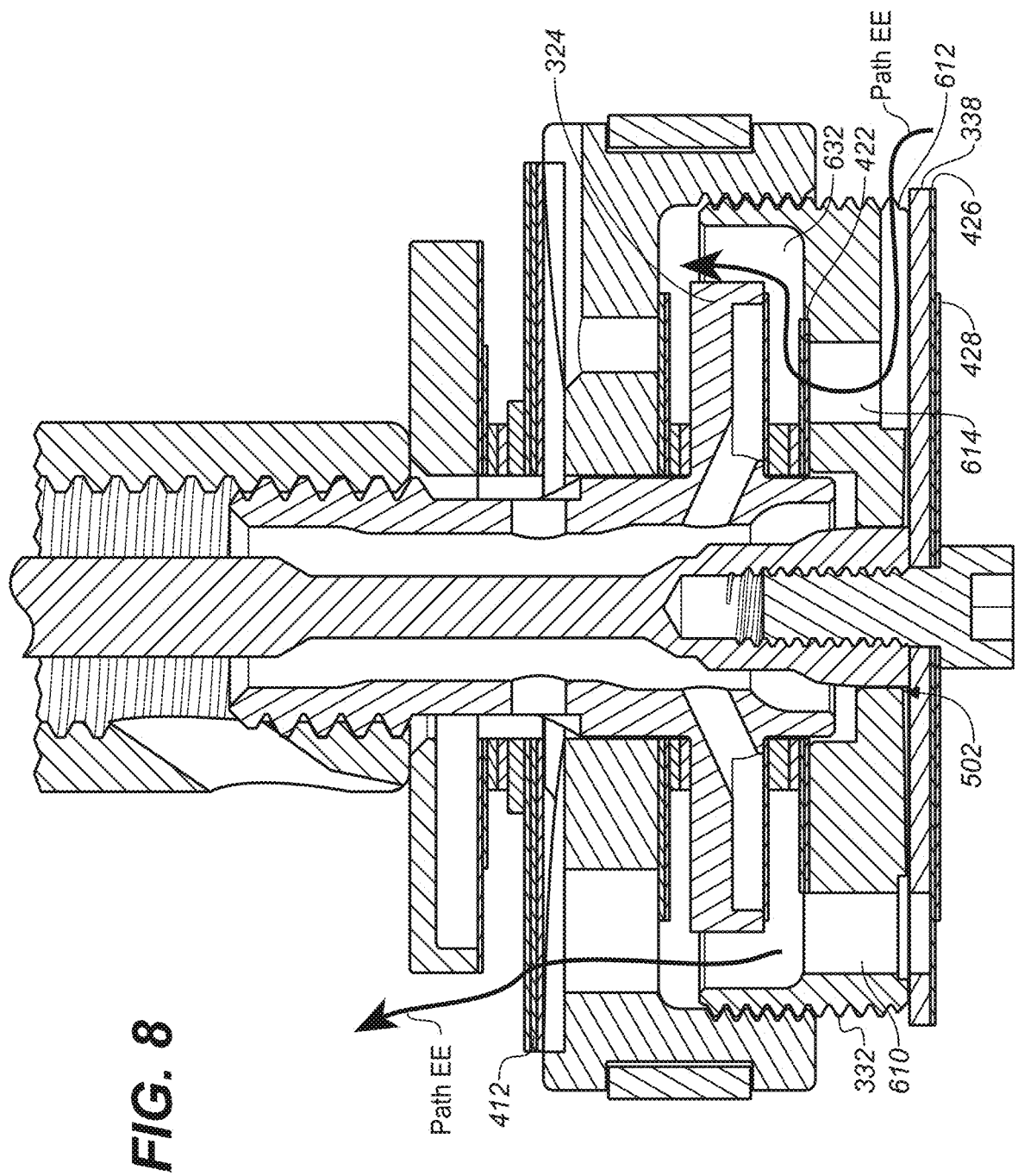
FIG. 8 is a sectional side elevation view of section B of FIG. 3B illustrating fluid pathway EE, in regard to lockout, in accordance with an embodiment.

Next will be described the following fluid flow modes and various adjustable fluid flow pathways associated therewith: the low speed rebound flow using fluid flow pathway AA (FIG. 6A); the high speed rebound flow using fluid flow pathway BB (FIG. 6B); the low speed compression flow using fluid flow pathway CC (FIG. 7A); the high speed compression flow using fluid flow pathway DD (FIG. 7B); and the lockout using fluid flow pathway EE (FIG. 8).

When the vehicle traverses small bumps, experiences braking and a rider's weight redistribution, etc., the shock absorber compresses at a low compression speed, compared to when the vehicle lands from a large jump. Thus, when the vehicle initially reacts to large bumps, landings, etc., the shock absorber compresses at a high compression speed. Generally and conventionally, after the shock absorber compresses at a slow compression speed, it rebounds at a slow rebound speed. Likewise, after the shock absorber compresses at a high compression speed, it rebounds at a high rebound speed. When the shock absorber does not compress or rebound at all, it is in a lockout mode. Embodiments enable the independent adjustment of the shock absorber's low compression speed and its low rebound speed, as well as the independent adjustment of the shock absorber's high compression speed and its high rebound speed. Further, the fluid flow rate threshold associated with the lockout mode (that fluid flow rate threshold that is necessary to be met for the lockout mode to become triggered) is capable of being adjusted independent of the adjustments made to accommodate other fluid flow modes.

Referring briefly to FIG. 3B, during an event causing the shock absorber 350 to compress, a portion of a vehicle attached to the mounting element 352 moves downward, thereby forcing the mounting element 352 (to which the vehicle is attached) downward. The mounting element 352 is attached to the gas cylinder 354. The dual piston valve 360 is pushed into the damping fluid cylinder 356 as the damping fluid cylinder 356 moves into the gas cylinder 354. Fluid of the fluid volume 358 flows from a first side 366 of the dual piston valve 360 to a second side 368 of the dual piston valve 360.

During an event causing the shock absorber 350 to rebound, a portion of the vehicle attached to the mounting element 352 moves upward, thereby releasing the downward pressure that is forcing the mounting element 352 downward and/or pulling the mounting element 352 upwards. The damping fluid cylinder 356 moves out of the gas cylinder 354 as the dual piston valve 360 moves closer to the top of the damping fluid cylinder 356. Further, as the dual piston valve 360 moves further to the top of the damping fluid cylinder 356, the fluid that had previously flowed to the second side 368, during the event causing the shock absorber 350 to compress, now flows from the second side 368 to the first side 366.

Embodiments enable the low speed rebound fluid flow to be adjusted independently of the high speed compression fluid flow and the high speed rebound fluid flow to be adjusted independently of the high speed compression fluid flow.

Figure 6A:
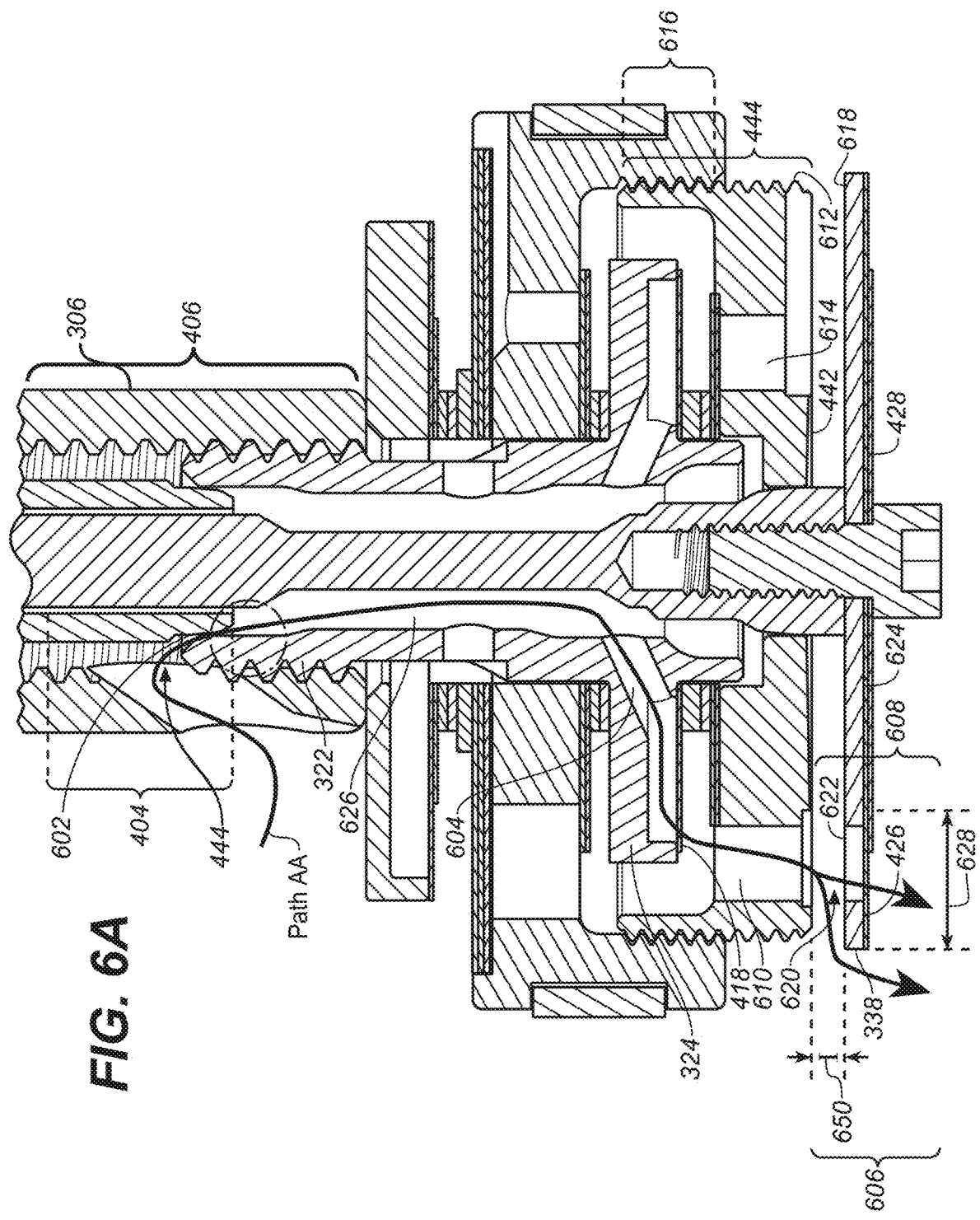
FIG. 6A is a sectional side elevation view of section B of FIG. 3B illustrating fluid pathway AA, during low speed rebound flow, in accordance with an embodiment.

FIG. 6A is an enlarged sectional side elevation view of section B of FIG. 3B illustrating fluid pathway AA in regard to low speed rebound fluid flow, in accordance with an embodiment. With reference to FIGS. 4A and 6A, the low speed and the high speed rebound fluid flow rate may be adjusted by adjusting the rebound adjust rod 302 such that the taper C (and the end 404) lies further into the shaft 306 and thus further into the piston bolt 322. Of note, and referring to FIGS. 4A and 6A, the piston bolt 322 is hollow and also includes and connects to the rebound check plate 324. The rebound check plate 324 includes one or more channels 604 through which fluid may flow. As can be seen in FIGS. 4A and 4B, the secondary (lockout) damping piston 332 has a concave shape with a base 442 and a side surface 450 that includes a portion of the base 442 and a lip 616 (see FIG. 6A). The base 442 has disposed there through two sets of passageways (a set [one or more] of outer diameter passageways 610 and a set [one or more] of inner diameter passageways 614). The side surface 450 has disposed thereon the threads 440.

As will be described later in regards to the lockout mode, on the outer bottom surface of the base 442 of the secondary (lockout) damping piston 332 is disposed a set (one or more) of channels 612 that are indentations carved into the outer bottom surface of the base 442, extending from the inner most part (closest to the core of the secondary [lockout] damping piston 332) of the set of inner diameter passageways 614 opening[s]) to the outermost edge of the outer bottom surface of the base 442 of the secondary (lockout) damping piston 332.

In various embodiments, depending upon an adjustment made by the user or the adjustment set by the manufacturer, the upper surface 618 of the lockout plate/rebound check valve 338 is spaced a distance 650 away from the outer bottom surface of the base 442 of the secondary (lockout) damping piston 332. Thus, in one embodiment, the outer bottom surface of the base 442 of the secondary (lockout) damping piston 332 and the upper surface 618 of the lockout plate/rebound check valve 338 do not touch, leaving a gap 620. The fluid then flows out of the set of outer diameter passageways 610, wherein the gap 620 is the distance 650 equal to a measurement that is greater than zero. In this instance, fluid may flow through the gap 620.

In another embodiment, if the distance 650 is zero, then the outer bottom surface of the base 442 of the secondary (lockout) damping piston 332 and the upper surface 618 of the lockout plate/rebound check valve 338 touch and do not leave a gap 620. The lockout plate/rebound check valve 338 includes a set (one or more) of channels 622 that traverse the entirety of the lockout plate/rebound check valve 338, from the upper surface 618 to the lower surface 624. As discussed, the shim 426 is disposed underneath the lockout plate/rebound check valve 338. Underneath the shim 426 is a smaller diameter shim 428. When the lockout plate/rebound check valve 338 is positioned such that it is against the secondary (lockout) damping piston 332, then the fluid that flows through the set of outer diameter passageway 610 flows through the set of channels 622 while pushing against the shim 426 to displace an edge 628 of the shim 426 away from the lower surface 624 of the lockout plate/rebound check valve 338. Directly below and pressing up against the rebound check plate 324 is the larger diameter shim 418 which is flexible, and bends in reaction to a particular force of fluid pressing against it to let fluid flow there through. It should be appreciated that such flexibility is due to the disposition of the larger diameter shim 418, and the extent to which the larger diameter shim 418 bends is due to, at least, the amount of force applied thereto by the fluid under pressure.

Thus, with reference to FIGS. 4A, 4B, 5 and 6A, in describing the low speed rebound flow of path AA, and as discussed herein, it is first seen that in response to an event that causes rebound to occur in the shock absorber 350, the damping fluid cylinder 356 moves out of the gas cylinder 354 such that the dual piston valve 360 moves from a position lower in the damping fluid cylinder 356 to a position that is higher in the damping fluid cylinder 356. In accomplishing this movement, since the dual piston valve 360 is moving upwards in the damping fluid cylinder 356, the portion of the fluid volume 358 that is at the second side 368 of the damping fluid cylinder 356 is pushed through the dual piston valve 360 to the first side 366 of the damping fluid cylinder 356.

In moving through the dual piston valve 360 in response to an event causing low speed rebound to occur in the shock absorber 350, it can be seen that a portion of the fluid that is located at the second side 368 moves into the set of holes 444 that are disposed at the end 406 of the shaft 306. The fluid then flows through the gap 602 (see FIG. 6A) between the outer surface of the taper C at the end 404 of the rebound adjust rod 302 and the inner surface of the piston bolt 322. Of note, since the fluid flow rate is low during a low speed rebound, the gap 602 that allows fluid to flow there through is sufficiently large to allow all or, at least, most of the fluid to flow there through at the low fluid flow rate caused by the event. This gap 602 is thus an adjustable orifice.

Of note, and as will be discussed with reference to FIG. 6B, in addition to the fluid flowing through the gap 602 (or in the alternative if the gap 602 is closed, such that there is no gap 602), if the fluid flow rate is too great for the fluid to successfully flow through the gap 602 at a fluid flow rate caused by the shock absorber 350 experiencing a rebound event, then the fluid will also flow through the channel 436 (see FIG. 6B).

Still with reference to FIG. 6A, during the response to the event causing the low speed rebound flow, after moving through the gap 602, the fluid then moves through the channel 626 in the piston bolt 322 towards the damping fluid cylinder 356. This channel 626 is disposed between the outer surface of the rebound adjust rod 302 and the inner surface of the wall of the hollow piston bolt 322. The fluid then flows into the channel 604 of the rebound check plate 324. Next, the fluid flows out of the channel 604 (that is disposed in the rebound check plate 324) and through the larger diameter shim 418 that is flexible and will bend when a certain amount of force is applied to it by the pressure created from the flow of the fluid initiated by the movement of the dual piston valve 360 upwards in the damping fluid cylinder 356 (during an event causing a rebound in the shock absorber 350 to occur). Once through the larger diameter shim 418, the fluid will flow into the set of outer diameter passageways 610. It should be appreciated that there may be one or more outer diameter passageways in the set of outer diameter passageways 610. Once through the larger diameter shim 418, if a gap 620 exists between the lockout plate/rebound check valve 338 and the bottom surface of the base 442 of the secondary (lockout) damping piston 332, then the fluid will flow out of the set of outer diameter passageways 610, through the gap 620, along the section 606 of the pathway AA. If a gap 620 does not exist between the lockout plate/rebound check valve 338 and the bottom surface of the base 442 of the secondary (lockout) damping piston 332, then the fluid will flow out of the channel 622 disposed in the lockout plate/rebound check valve 338, thereby pushing open the shim 426 to flow there through and into the first side 366 of the damping fluid cylinder 356.

Thus, it can be seen that the rate of flow regarding the low speed rebound fluid flow may be adjusted by adjusting the rebound adjust rod 302 via a mechanism connected to the adjuster element 402. In such a manner, the rebound adjust rod 302 may be moved upwards or downwards, thereby moving the taper C at the end 404 of the rebound adjust rod 302 further into or out of the interior of the piston bolt 322. By pulling the rebound adjust rod 302 further out of the shaft 306, the gap 602 widens, thereby enabling the flow of the fluid through the gap 602 during low speed rebound to increase, and thereby lessening the damping effect experienced by the shock absorber 350. However, by pushing the rebound adjust rod 302 further into the shaft 306, the gap 602 narrows, thereby further limiting the ability of the flow of fluid to flow through the gap 602, and thereby increasing the damping effect experienced by the shock absorber 350. Of additional note, the low speed rebound flow path AA initially flows through channels close to the inner diameter of the dual piston valve 360, and then moves further away from the core of the dual piston valve 360 and to channels located close to the outer diameter of the dual piston valve 360. This is in contrast to the location of the channels through which fluid flows for the high speed rebound flow, as will be discussed next with reference to FIG. 6B.

Figure 6B:
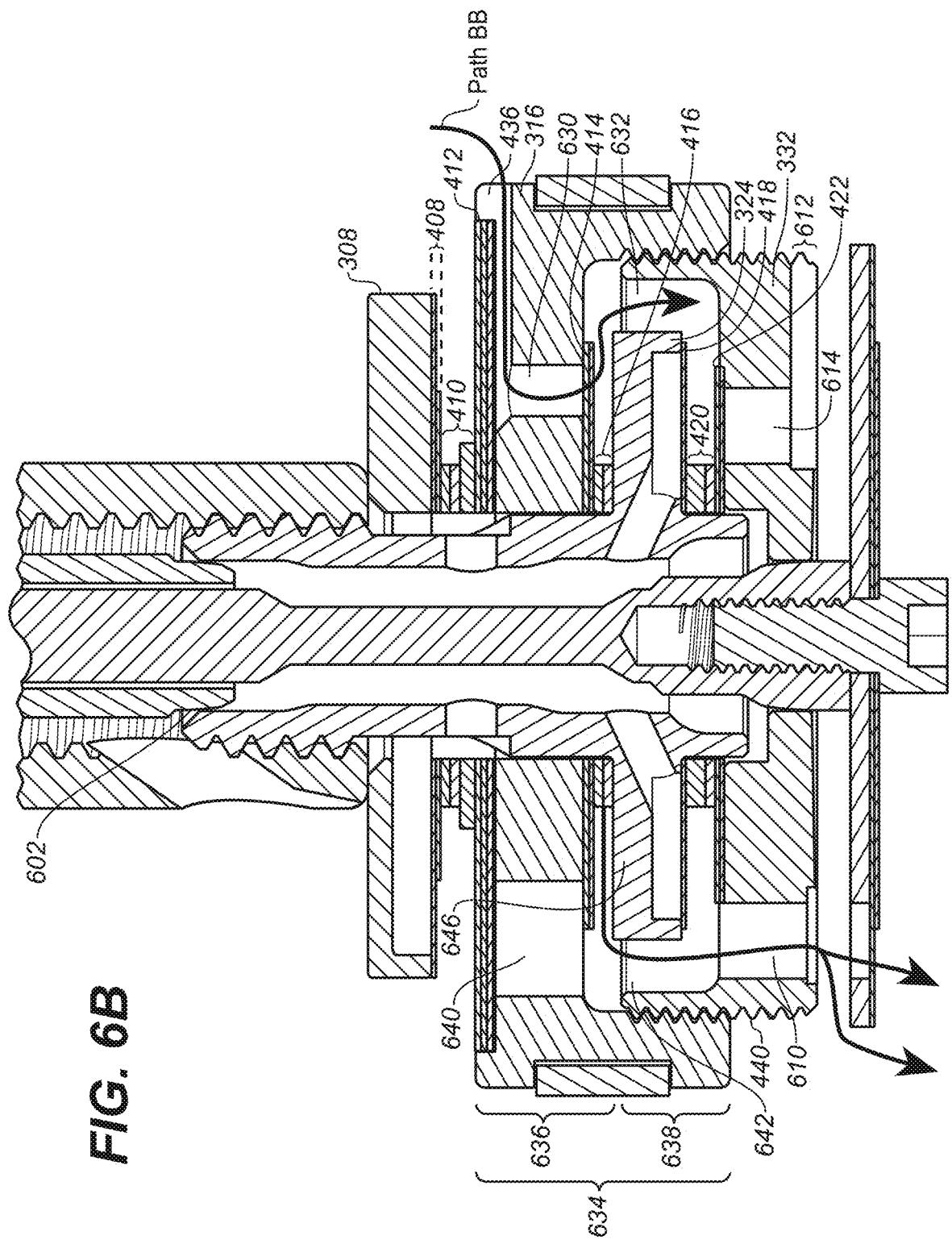
FIG. 6B is a sectional side elevation view of section B of FIG. 3B illustrating fluid pathway BB, during high speed rebound flow, in accordance with an embodiment.

FIG. 6B is a sectional side elevation view of section B of FIG. 3B illustrating fluid pathway BB, in regard to high speed rebound fluid flow, in accordance with an embodiment. The fluid pathway BB is disposed within the dual piston valve 360 and lies in parallel with the low speed rebound fluid pathway AA (shown in FIG. 6A). That is, during the low speed rebound flow, the fluid flow through the fluid pathway AA travels from the second side 368 to the first side 366 of the dual piston valve 360 within the damping fluid cylinder 356. Likewise, during the high speed rebound flow, the fluid flow through the fluid pathway BB travels from the second side 368 to the first side 366 of the dual piston valve 360 within the damping fluid cylinder 356. Both fluid pathways AA and BB eventually flow out of the set of outer diameter passageways 610. Both fluid pathways AA and BB enable fluid to flow from the second side 368 to the first side 366 of the dual piston valve 360 within the damping fluid cylinder 356. However, a substantial portion of the fluid pathway AA is disposed at a different location within the dual piston valve 360 than the fluid pathway BB. The low speed rebound flow of the fluid travels through the fluid pathway AA, in which a substantial portion of the fluid pathway AA is located closer to the core of the dual piston valve 360 than a substantial portion of the fluid pathway BB that is designed for the high speed rebound flow of fluid. This design is advantageous to enable more efficiently functioning rebound damping since the area for which fluid may flow is smaller when closer to the core of the dual piston valve 360 than the area for which fluid may flow when closer to the outer diameter of the dual piston valve 360. Thus, when the fluid needs to flow faster to accommodate a greater flow rate, such as during high speed rebound flow events, the fluid is enabled to flow in the larger fluid passageways that are disposed toward the outer diameter of the dual piston valve 360 (e.g., channel 436, set [one or more] of inner diameter passageways 614 of the main damping piston 316, the gap 632 between the rebound check plate 324 and the surface of the inner wall of the secondary [lockout] damping piston 332, and the set of outer diameter passageways 610). However, when the fluid does not need to flow as fast, such as during low speed rebound flow events, the fluid flows in the smaller fluid passageways that are disposed closer to the core of the dual piston valve 360 (e.g., the channel 626 in the piston bolt 322 and the channel 604).

Of note, as can be seen in FIGS. 4A and 6B, the main damping piston 316 has a concave shape with a base 636 and a side surface 634 that includes a portion of the base 636 and a lip 638 (see FIG. 6B). The base 636 has disposed there through two sets of passageways (a set [one or more] of inner diameter passageways 630 disposed closer to the core of the main damping piston 316 and a set [one or more] of outer diameter passageways 640 disposed closer to the outer diameter of the main damping piston 316). In one embodiment, the set of inner diameter passageways 630 has a smaller diameter than that diameter(s) of the set of outer diameter passageways 640. The inner surface of the lip 638 includes threads 642 which match the threads 440 disposed on the side surface 450 of the secondary (lockout) damping piston 332, such that the secondary (lockout) damping piston 332 and the main damping piston 316 may be screwed together. On the outer top surface of the base 636 of the main damping piston 316 is disposed a set (one or more) of channels 436 that are indentations carved into the main damping piston 316, extending from the inner most part (closest to the core of the main damping piston 316) of the set of inner diameter passageways 630 openings(s) to the outermost edge of the outer top surface of main damping piston 316.

Thus, with reference to FIGS. 4A, 4B, 5 and 6B, in describing the high speed rebound flow of path BB, it is noted and as described herein, that in response to an event that causes rebound to occur in the shock absorber 350, the damping fluid cylinder 356 moves out of the gas cylinder 354 such that the dual piston valve 360 moves from a position lower in the damping fluid cylinder 356 to a position that is higher in the damping fluid cylinder 356. In accomplishing this movement, since the dual piston valve 360 is moving upwards in the damping fluid cylinder 356, the portion of the fluid volume 358 that is at the second side 368 of the damping fluid cylinder 356 is pushed through the dual piston valve 360 to the first side 366 of the damping fluid cylinder 356.

During the movement through the dual piston valve 360 in response to an event causing high speed rebound flow to occur in the shock absorber 350, it can be seen that a portion of the fluid that is located at the second side 368 moves into the set of holes 444 that are disposed at the end 406 of the shaft 306. If the area of the gap 602 is not large enough for the fluid that is flowing at a certain rate to move there through, then the fluid that is not able to move through the gap 602 is pushed through the fluid pathway BB (which is the high speed rebound fluid pathway).

The fluid pathway BB begins with the flow of fluid through the set of channels 436 of the main damping piston 316. From the set of channels 436, the fluid moves into the set of inner diameter passageways 630 (which, of note, is still closer to the outer diameter of the dual piston valve 360 than the channel 626 [of the fluid flow pathway AA] through the piston bolt 322). From the set of inner diameter passageways 630, the fluid pushes open the shims 414. Of note, it should be appreciated that the shims 414 are manufactured to have a particular flexibility such that a particular predetermined amount of pressure causing fluid to press against the shims 414 will cause the shims 414 to bend a particular amount. As the shims 414 are pinched at the inner edge to or near the piston bolt 322, the outer edge of the shims 414 may move and bend in the direction of the lockout plate/rebound check valve 338 when enough force is applied to the shims 414 via a particular pressure causing the fluid to flow at a particular rate.

Of further note, the rebound check plate 324 lies within the concave portion of the main damping piston 316. The inner bottom surface of the concave portion of the main damping piston 316 is separated from the top surface 646 of the rebound check plate 324 by the shims 414 and the small diameter shims 416. After pushing the outer edge of the shims 414 open, the fluid enters the gap 632 between the rebound check plate 324 and the inner surface of the lip 616 of the secondary [lockout] damping piston 332) and/or the inner surface of the lip 638 of the main damping piston 316.

However, in this situation, the shims 422 block the fluid from flowing into the set of inner diameter passageways 614 of the secondary (lockout) damping piston 332. The gap 632 is positioned above the opening to the set of outer diameter passageways 610 of the secondary (lockout) damping piston 332.

As with the fluid pathway AA, if the gap 620 exists between the lockout plate/rebound check valve 338 and the bottom surface of the base 442 of the secondary (lockout) damping piston 332, then the fluid will flow out of the set of outer diameter passageways 610, through the gap 620, and along the section 606 of the path AA. If a gap 620 does not exist between the lockout plate/rebound check valve 338 and the bottom surface of the base 442 of the secondary (lockout) damping piston 332, then the fluid will flow out of the channel 622 disposed in the lockout plate/rebound check valve 338, thereby pushing open the shim 426 to flow there through and into the first side 366 of the damping fluid cylinder 356.

As can be seen, the high speed rebound flow path BB initially flows through and remains flowing through channels positioned closer to the outer diameter of the dual piston valve 360 than those channels involved in the low speed rebound flow path AA.

FIG. 7A is a sectional side elevation view of section B of FIG. 3B illustrating fluid pathway CC in regard to low speed compression flow, in accordance with an embodiment. The low speed fluid flow rate may be adjusted by adjusting the compression adjust rod 340 such that the taper D (and the end 424) lies further into the secondary (lockout) damping piston 332 and the rebound check plate 324. Of note, the piston bolt 322 includes a set (one or more) of pivot bolt holes 702 disposed at the base of the piston bolt 322 close to the rebound check plate 324 and below the threads 712 on the outer surface of the piston bolt 322. Additionally, the rebound check plate 324 includes a top surface 708 and a bottom surface 710. The bottom surface has an annular lip 704 extending therefrom. The annular lip 704 surrounds a hole disposed central thereto. The compression check plate 308 includes a first surface 714 and a second surface 730. Indentations 718 in the second surface 730 provide a channel for fluid to flow there through. At least a portion of the indentations 718 connect to the inner most edge 716 of the compression check plate 308, such that the pivot bolt holes 702 and the indentations 718 provide a continuous channel for which the fluid to flow. However, the indentations 718 do not extend to the outer diameter edge 728 of the compression check plate 308.

Directly underneath the indentations 718 are disposed low speed compression check shims 408. Underneath the low speed compression check shims 408 are pivot shims 410. The low speed compression check shims 408 and the pivot shims 410 are pinched (herein, the term, "pinched" refers to a component being clamped to another component such that the pinched component remains at a particular location) at the edge closest to the central core of the dual piston valve 360 such that the inner edges do not move, while allowing for the outer edges of the low speed compression check shims 408 to move away from the indentations 718 of the compression check plate 308 when fluid flow pushes against the low speed compression check shims 408 with enough force to cause the outer edge of the low speed compression check shims 408 to flex downwards and away from the indentations 718.

With reference to FIGS. 4A, 4B and 7A, in describing the low speed compression flow of path CC, it should first be noted that in response to an event that causes compression to occur in the shock absorber 350, the damping fluid cylinder 356 moves into the gas cylinder 354 such that the dual piston valve 360 moves from a position higher in the damping fluid cylinder 356 to a position that is lower in the damping fluid cylinder 356. In accomplishing this movement, since the dual piston valve 360 is moving downwards in the damping fluid cylinder 356, the portion of the fluid volume 358 that is at the first side 366 of the damping fluid cylinder 356 is pushed through the dual piston valve 360 to the second side 368 of the damping fluid cylinder 356.

In moving through the dual piston valve 360 in response to an event causing low speed compression to occur in the shock absorber 350, it can be seen that a portion of the fluid that is located at the first side 366 moves into the gap 620 and then through the gap 502 at the taper D at the end 424 of the compression adjust rod 340. The gap 502 is an adjustable orifice. The fluid then flows through the channel 706 disposed between the lip 704 and the taper D. Subsequently, the fluid continues to flow from the channel 706 to and through the channel 626 in the piston bolt 322. From the channel 626, the fluid flows through the pivot bolt holes 702 and into the indentations 718 disposed in the compression check plate 308. The fluid flow pushes against the low speed compression check shims 408, and upon the flexing (bending) of the outer edge of the low speed compression check shims 408 downwards and away from the indentations 718, the fluid flows out of the indentations 718 (that provide a channel through the compression check plate 308) and into the second side 368 of the damping fluid cylinder 356.

Of note, a substantial portion of the low speed compression fluid flow along flow path CC occurs in fluid flow paths disposed closer to the core of the dual piston valve 360.

FIG. 7B is a sectional side elevation view of section B of FIG. 7B illustrating fluid pathway DD, in regard to high speed compression fluid flow, in accordance with an embodiment. The fluid pathway DD is disposed with the dual piston valve 360 and lies in parallel with the low speed compression fluid pathway CC (shown in FIG. 7A). That is, during the low speed compression flow, the fluid flow through the fluid pathway CC travels from the first side 366 to the second side 368 of the dual piston valve 360 within the damping fluid cylinder 356. Likewise, during the high speed compression flow, the fluid flow through the fluid pathway DD travels from the first side 366 to the second side 368 of the dual piston valve 360 within the damping fluid cylinder 356. Both of the fluid pathways CC and DD enable fluid to flow from the first side 366 to the second side 368 of the dual piston valve 360 within the damping fluid cylinder 356. However, a substantial portion of the fluid pathway CC is disposed at a different location within the dual piston valve 360 than the fluid pathway DD. The low speed compression flow of the fluid travels through the fluid pathway CC, in which a substantial portion of the fluid pathway CC is located closer to the core of the dual piston valve 360 than a substantial portion of the fluid pathway DD that is designed for the high speed compression flow of fluid. As discussed herein, this design is advantageous to enable more efficiently functioning compression damping since the area for which fluid may flow is smaller when closer to the core of the dual piston valve 360 than the area for which fluid may flow when closer to the outer diameter of the dual piston valve 360.

Thus, with reference to FIGS. 4A, 4B and 7B, in describing the high speed compression flow of path DD, it is noted and as described herein, that in response to an event that causes compression to occur in the shock absorber 350, the damping fluid cylinder 356 moves into the gas cylinder 354 such that the dual piston valve 360 moves from a position higher in the damping fluid cylinder 356 to a position that is lower in the damping fluid cylinder 356. In accomplishing this movement, since the dual piston valve 360 is moving downwards in the damping fluid cylinder 356, the portion of the fluid volume 358 that is at the first side 366 of the damping fluid cylinder 356 is pushed through the dual piston valve 360 to the second side 368 of the damping fluid cylinder 356.

During this movement through the dual piston valve 360 and in response to an event causing high speed compression flow to occur in the shock absorber 350, it can be seen in FIG. 7B that a portion of the fluid that is located at the first side 366 moves into the gap 502 and through the channel 706. If the area of the gap 502 is not large enough for the fluid that is flowing at a certain rate to move there through, then the fluid that is not able to move through the gap 502 is pushed through the fluid pathway DD, the high speed compression fluid pathway.

The fluid pathway DD begins with the flow of fluid, that is located at the first side 366, into the gap 620, and then through the set of outer diameter passageways 610. The fluid flow then pushes against the high speed compression shims 412 with enough force to cause the high speed compression shims 412 to bend and thus open up, thereby letting the fluid flow there through and into the second side 368.

As can be seen, the high speed compression flow path DD initially flows through and remains flowing through channels positioned closer to the outer diameter of the dual piston valve 360 than the position of the channels involved in the low speed compression flow path CC.

Thus, it can be seen that the rate of fluid flow regarding the low speed compression fluid flow may be adjusted by adjusting the compression adjust rod 340 via a mechanism connected to the compression adjust rod 340. As the compression adjust rod 340 is raised and lowered, the amount of fluid that enters the flow paths CC and DD is varied. For example, in one embodiment, the compression adjust rod 340 is connected to an adjuster. The adjuster can be twisted, which in turn causes the compression adjust rod 340 to slide up or down. For example, adjusting the compression adjust rod 340 such that more fluid flows into the fluid pathway CC (by opening the gap 502 between the taper D and the secondary [lockout] damping piston 332) will create a higher compression flow rate, as is discussed above with respect to FIG. 7B. The higher compression flow rate will not only cause a portion of the fluid to flow through the fluid pathway CC designed for low speed compression flow, but cause a portion of the fluid to flow through the checked fluid pathway DD (see FIG. 7B), which can accommodate a greater level of fluid flow there through.

FIG. 8 is a sectional side elevation view of section B of FIG. 3B illustrating fluid pathway EE, in regard to lockout, in accordance with an embodiment. Lockout occurs when the shock absorber experiences a great enough force such that the shock absorber does not move to provide a damping effect. However, embodiments enable a lockout circuit to be adjusted independently of the compression and rebound modes.

The flow of fluid along pathway EE begins, when the lockout plate/rebound check valve 338 is positioned such that it is lying against the secondary (lockout) damping piston 332 and the shims 426 and 428 are lodged against the lockout plate/rebound check valve 338 such that the fluid on the first side 366 of the damping fluid cylinder 356 is not able to flow between the taper D at the end 336 and the secondary (lockout) damping piston 332 or flow through the set of outer diameter passageways 610.

However, even though the entrance from the first side 366 to the set of outer diameter passageways 610 and the gap 502 are closed, fluid is still able to flow through the set of channels 612, push open the shims 422 that are blocking the exits of the set of channels 612, flow into the set of inner diameter passageways 614, and push open the high speed compression shims 412. The lockout circuit fluid pathway EE keeps the shock absorber 350 from experiencing a high enough force that the shock absorber 350 does not want to move (such as during the event when a rider comes off a jump and slams the frame down onto the ground). Thus, if the shock absorber 350 experiences an excess of a certain amount of fluid pressure due to a certain force, it allows for a blow off of this pressure to occur.

Of note, in one embodiment, the dual piston system 300 includes two concentric knobs with concentric cams that translate the movement into an up and down sliding movement of the rods that are connected to tapers. The two concentric knobs control the low speed compression and rebound fluid flow. The compression and rebound forces on the shims that are required to be present to cause the shims to flex is set at the manufacturer.

While the foregoing is directed to embodiments of the present invention, other and further embodiments of the invention may be implemented without departing from the scope of the invention, and the scope thereof is determined by the claims that follow.

I claim:

1. A piston system for controlling compression fluid flow and rebound fluid flow there through, said piston system comprising:
   a first adjustable orifice, wherein said first adjustable orifice is adjustable to have a first area, wherein said first area of said first adjustable orifice is large enough to enable said rebound fluid flow having a first flow rate to flow through a first rebound flow path associated with a low speed rebound fluid flow and said first adjustable orifice is adjustable to have a second area, wherein said second area of said first adjustable orifice is not large enough to enable all of said rebound fluid flow having a second flow rate to flow through said first rebound flow path such that at least a portion of said rebound fluid flow having said second flow rate flows through a second rebound flow path associated with a high speed rebound fluid flow;
   a second adjustable orifice, wherein said second adjustable orifice is adjustable to have a first area, wherein said first area of said second adjustable orifice is large enough to enable said compression fluid flow having a first flow rate to flow through a first compression flow path associated with a low speed compression fluid flow and said second adjustable orifice is adjustable to have a second area, wherein said second area of said second adjustable orifice is not large enough to enable all of said compression fluid flow having a second flow rate to flow through said first compression flow path such that at least a portion of said compression fluid flow having said second flow rate flows through a second compression flow path associated with a high speed compression fluid flow;
   a first piston;
   a second piston fluidically coupled with said first piston, wherein said first piston and said second piston each comprises at least a portion of said first rebound flow path, said second rebound flow path, said first compression flow path, and said second compression flow path;
   a lockout plate/rebound check valve configured for controlling lockout fluid flow through a lockout flow path, wherein said lockout plate/rebound check valve is positionally adjustable and blocks fluid from flowing into a set of outer diameter passageways disposed within said first piston;
   a blow-off valve positioned within said first piston, wherein said piston system enables independent adjustment of said low speed compression fluid flow, said high speed compression fluid flow, said low speed rebound fluid flow, and said high speed rebound fluid; and two concentric knobs with concentric cams, a first of said two concentric knobs configured to control said low speed compression fluid flow, a second of said two concentric knobs configured to control said low speed rebound fluid flow, said first of said two concentric knobs coupled to a first rod wherein rotation of said first of said two concentric knobs causes said first rod to move in a direction parallel of a central axis of a damper in which said piston system is disposed, said second of said two concentric knobs coupled to a second rod wherein rotation of said second of said two concentric knobs causes said second rod to move in a direction parallel of said central axis of said damper in which said piston system is disposed.

2. The piston system of claim 1, wherein said first rebound flow path, said second rebound flow path, said first compression flow path, and said second compression flow path are different from each other.

3. The piston system of claim 1, wherein said first rebound flow path and said first compression flow path comprise a first set of passageways, and said second rebound flow path and said second compression flow path comprise a second set of passageways, wherein said first set of passageways is disposed a first distance from a core of said piston system, and said second set of passageways is disposed a second distance from a core of said piston system, and wherein said second distance is not less than said first distance.

4. The piston system of claim 3 wherein said first piston and said second piston each comprises at least a portion of said first rebound flow path, said second rebound flow path, said first compression flow path, said second compression flow path and a lockout flow path.

5. The piston system of claim 4, wherein said first rebound flow path, said second rebound flow path, said first compression flow path, said second compression flow path, and said lockout flow path are different from each other.

* * * * *